| United States Patent [19] | [11] 4,028,088 |
|---|---|
| Young et al. | [45] June 7, 1977 |

[54] SOIL AMENDMENT AND METHOD

[75] Inventors: Donald C. Young, Fullerton; P. Stanley Backlund, Anaheim, both of Calif.

[73] Assignee: Union Oil Company of California, Brea, Calif.

[22] Filed: Dec. 17, 1975

[21] Appl. No.: 641,366

[52] U.S. Cl. .................................... 71/28; 71/29; 71/53; 71/64 F; 423/396
[51] Int. Cl.² .......................................... C05C 9/00
[58] Field of Search ................ 71/28, 29, 53, 64 E, 71/64 F; 260/125; 423/396

[56] References Cited

UNITED STATES PATENTS

| 2,074,880 | 3/1937 | Whittaker et al. | 71/28 X |
| 3,149,956 | 9/1964 | Seymour et al. | 71/29 |
| 3,501,282 | 3/1970 | Titus | 71/28 |
| 3,576,613 | 4/1971 | Fleming | 71/28 |
| 3,580,715 | 5/1971 | Dilday | 71/28 |
| 3,617,239 | 11/1971 | Klanica | 71/28 |
| 3,649,598 | 3/1972 | Namioka et al. | 71/28 X |
| 3,785,796 | 1/1974 | Mann, Jr. | 71/28 |
| 3,867,124 | 2/1975 | Church | 71/28 |
| 3,903,333 | 9/1975 | Shirley, Jr. et al. | 71/28 X |

Primary Examiner—Frank A. Spear, Jr.
Assistant Examiner—Ferris H. Lander
Attorney, Agent, or Firm—Richard C. Hartman; Dean Sandford; Michael H. Laird

[57] ABSTRACT

This invention relates to methods of producing multi-component soil additives. The compositions comprise particle-form combinations of calcium sulfate and a nitrifier selected from urea, ammonium nitrate, and combinations of these, in which the nitrifier particles are coated with a layer of the reaction product of hydrated calcium sulfate and urea, ammonium nitrate, or both. This layer, in turn, contains an additional soil additive such as elemental sulfur or the major and minor plant nutrients such as phosphorus, potassium, magnesium, copper, zinc and the like. The particles are produced by reacting the particle-form nitrifier, preferably urea or ammonium nitrate prills, with hydrated calcium sulfate intimately mixed with one or more additional soil additives and a binder supplement comprising powdered urea and/or ammonium nitrate having particle sizes below 30 mesh. Reaction is promoted by heating to a temperature sufficient to initiate the endothermic reaction without melting or thermally decomposing the nitrifier.

16 Claims, 1 Drawing Figure

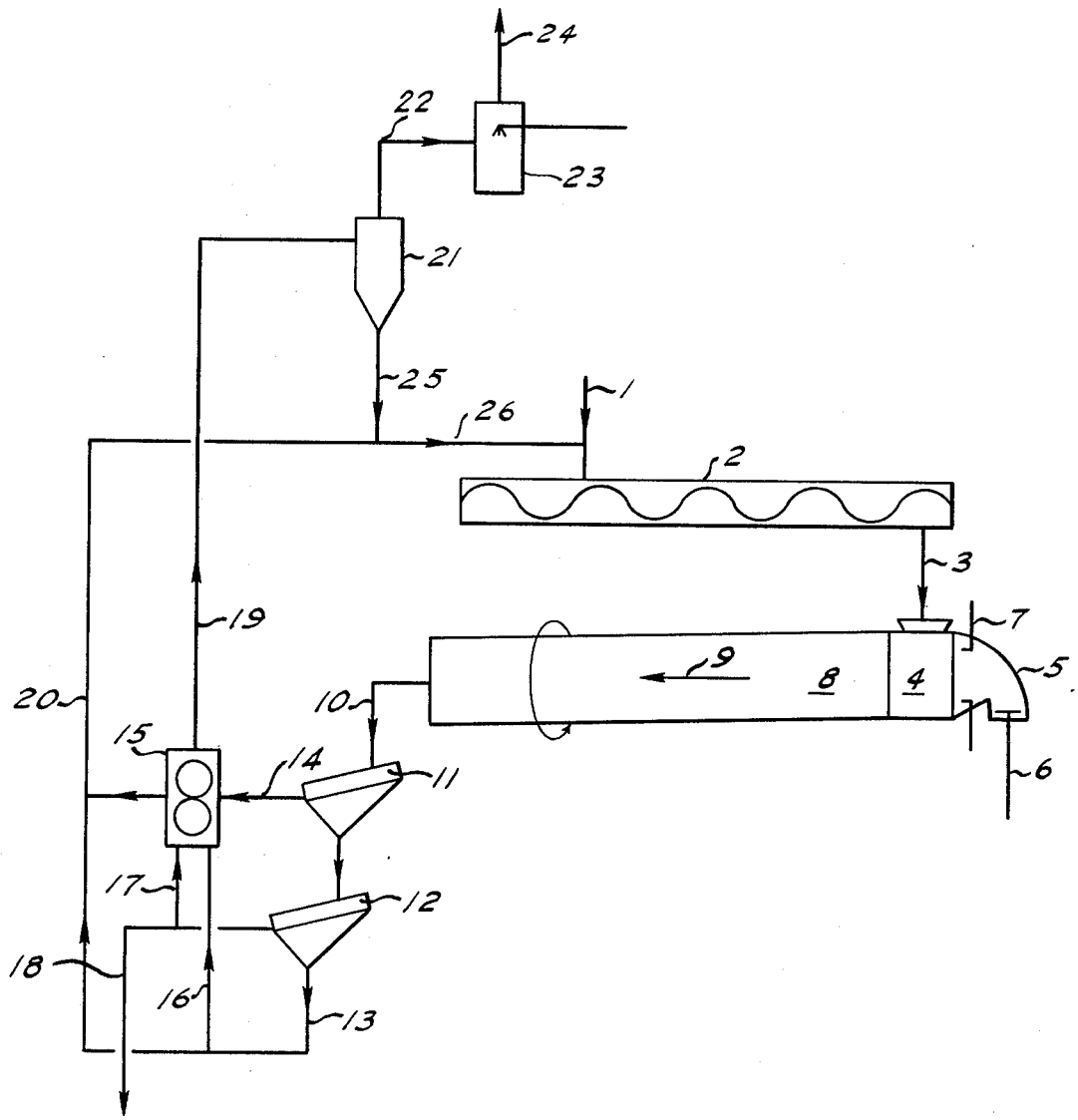

SOIL AMENDMENT AND METHOD

BACKGROUND OF THE INVENTION

The several components are widely used as plant nutrients or soil additives for modifying soil acidity or converting nutrients present in the soil to available forms. Similarly, urea and ammonium nitrate particles are commercially available and are generally applied to the soil as such. However, it is often desirable to apply several additives, such as the major or minor nutrients, simultaneously. This can be accomplished with a physical mixture of powders or particles of the several components. One disadvantage of this approach is the practical impossibility of obtaining a mixture of sufficiently uniform particle size to prevent settling and segregation of the several components during transportation, storage or use. This approach also does not take advantage of at least one factor governing the availability of plant nutrients to crops. Many soils are generally basic in character, having pH levels above about 8.0, while the plant nutrients may be relatively immobile, i.e., water insoluble, under basic conditions.

The mobility of these nutrients and, consequently, their availability to the crops, can be increased by reducing soil pH. This is accomplished to some extent by the action of nitrifying bacteria on urea or ammonium nitrate by which all the nitrogen is converted to available nitrates. However, this effect is apparent primarily, if not exclusively, in the immediate vicinity of the nitrifier particles. Consequently, broadcasting a physical mixture would not place the basic, immobile additives such as magnesium oxide, iron sulfate, manganese sulfate, etc., in close enough proximity to the nitrifier particles to take the greatest advantage of the pH reduction occurring in the immediate particle vicinity. Increased mobility associated with acidification occurs whether the additional soil additives or nutrients are added in soluble or mobile forms. Soluble materials might otherwise be converted to the insoluble, basic forms in a basic environment.

One obvious solution is to combine the additive with the nitrifier in the form of a particle during the production of the nitrifier particle. Presumably, this could be done by mixing the additive with the melt or solution during the prilling operation. This is often impossible, however, due to the compatibility of some soil additives, e.g., elemental sulfur, and molten urea or ammonium nitrate. Secondly, it introduces complexities into the prilling operation which may or may not be easily solvable or economically acceptable. Prilling procedures usually involve large scale, continuous operations which would have to be interrupted periodically to produce custom formulations of different compositions as the demand required.

Due to the wide commercial availability of nitrifier particles as such, it would be most desirable to devise a method for combining the additional nutrients and with the particles on a small scale without appreciable difficulty; a method that would not interfere with the large scale particle production in the first instance. However, this approach is also complicated by several factors, primarily the physical structure of the nitrifier particles and their incompatibility with other soil amendments.

For instance, prills have low porosity; essentially no surface porosity for practical purposes. Thus very little if any material can be added to the particle surface by a simple procedure. The secondary components cannot be added practically in aqueous solutions since the nitrifiers are hygroscopic, adsorb water very rapidly, and dissolve or become sticky and cohesive at very low water levels. Impregnation instantly results in an unhandleable cemented mass.

It thus remains to attempt the combination of nitrifier particles and additional amendments by some procedure that does not require the use of sufficient free water to dissolve those components. The majority of the additives do not fuse at temperatures below the nitrifier melting point. Even sulfur, which does have a relatively low melting point, is not compatible with the nitrifiers even in the molten form.

These difficulties have not completely eliminated all efforts to produce such materials. One suggestion involves coating urea particles with wax and then introducing the amendments which adhere to the wax coating. The prior art accurately observes, however, that in order to produce a coating which is sufficiently cohesive to retain the additional components, one also produces particles which agglomerate, thereby introducing obvious complications and disadvantages. The prior art also suggests that agglomeration can be overcome, at least to some extent, by adding clays such as keiselguhr to the combination of urea, wax and sulfur or other additives. While to some extent accomplishing the objective, this approach also has several drawbacks. It requires the addition of materials such as waxes and clays which have little or no utility in the final product (except for water-proofing if desired) resulting in increased manufacturing cost and expense of shipping, handling and application.

It is therefore an object of this invention to provide an improved, particulate multicomponent soil amendment containing urea or ammonium nitrate, calcium sulfate and at least one additional soil additive or plant nutrient. Another object is the provision of a simple procedure for producing such multicomponent soil amendments. Another object involves the provision of a method for producing intimate mixtures of soil additives and/or plant nutrients from readily available materials such as commercial prills. Another object is the provision of an improved method for applying agronimically effective amounts of soil amendments and/or plant nutrients to the soil. A preferred objective is the provision of multicomponent soil amendments containing urea, calcium sulfate and additional soil additives in which the additional additives are in such close proximity to the urea that maximum benefit is derived from the acidic environment created in the immediate proximity of the urea particles by nitrification.

DETAILED DESCRIPTION OF THE INVENTION

We have found that compositions containing urea and/or ammonium nitrate particles, calcium sulfate and one or more additives or plant nutrients can be produced from commercial prills by mixing hydrated calcium sulfate, soil amendments, nitrifier particles and powdered nitrifier, and heating the combination to a temperature sufficient to react the calcium sulfate and nitrifier. The additional amendments, which alone will not combine with the nitrifier particles, firmly adhere to or are encapsulated in the resulting product phase.

We have found that the powdered nitrifier acts as a binder supplement in that it significantly improves coating quality, apparently by facilitating the formation of the reaction product layer at the nitrifier particle periphery. The binder supplement distinguishes from the nitrifier particle feed primarily as a function of particle size and this difference in turn controls the manner in which the binder supplement participates in the reaction. The powdered nitrifier or supplement is characterized as having particle sizes below about 30 mesh, preferably below about 40 mesh.

In contrast, the nitrifier particles have particle sizes within the range of 5 to about 30 mesh. These mesh designations refer to U.S. standard sieve sizes while the range of mesh sizes specified for each ingredient indicates that the largest particles contemplated within the range will pass the largest sieve size designated while the smallest particles will be retained on the smallest screen size. However, the requirement that the binder supplement be a powder passing 30 mesh and preferably passing 40 mesh does not mean the particles of intermediate size cannot be included. For instance, a preferred nitrifier particle feed may have particle sizes ranging from 6 to 16 mesh whereas the preferred binder supplement has particle sizes below about 40 mesh. Nevertheless, while it is not essential to this invention, the total mixture can contain a significant amount of nitrifier material having particle sizes smaller than 16 mesh yet larger than 40 mesh. While that situation is not preferred, it need not be excluded from the scope of these methods and compositions.

The reaction does not involve the additives which do not interact chemically with either calcium sulfate or the nitrifiers under these conditions. It presumably proceeds at the calcium sulfate-nitrifier interface beyond which the third components would not seem to penetrate. Thus, it would not be expected that, nor is it presently understood how, these components are captured and retained by the reaction product. Nevertheless, they are retained, presumably in the reaction product and in close association with the nitrifier. While the additives are securely retained in the reaction product layer, excessive amounts of large agglomerates do not form.

This latter aspect gives rise to yet another advantage of these methods. It is often the case in commercial operations that the product particle size distribution is broader than that preferred by the manufacturer or customer. For any one of several reasons either the producer or consumer may not be able to effectively handle or use particles having diameters above or below a specified range. For instance, fines increase bulk density and promote more coherent packing during storage and shipment and a higher angle of repose which complicates loading and handling. Finer particles also change the distribution or scattering pattern of the entire product and limit the effectiveness of application equipment such as that employed for fertilization.

It is obviously desirable to avoid waste of the over-or undersized material. However, in the case of the compositions here involved a reaction between the several feed components has already occurred. Thus it might appear that the oversized or undersized material could not be recycled and reused. However, we have found that this is not the case. Under the conditions herein specified, recycle of a certain amount of powdered product actually benefits the entire operation. It facilitates coating of the larger particles at conditions under which complete coating is not otherwise obtained. It also promotes agglomeration of undersized material into particles having diameters within the preferred range.

While these several advantages can be obtained in batch operations, their benefit is particularly apparent in continuous operation with partial product recycle. In oncethrough or continuous operations without recycle, the reaction mix can be prepared by combining nitrifier particles, calcium sulfate, one or more additives and the binder supplement, either upstream of or within the heating zone. However, premixture is presently preferred. The supplement should comprise at least 1 weight percent, preferably at least 2 weight percent of the total premix determined as urea or ammonium nitrate and will generally fall between about 1 and about 10 percent of the total. In the continuous process with recycle described hereinafter, these quantities of binder supplement will correspond to at least about 2, preferably at least about 4, and generally about 2 to about 20 weight percent recycle of the crushed reaction product.

These soil amendments make maximum use of the acidic environment created in the immediate vicinity of the nitrifier. Thus, even in the most basic soils, soil additives which would otherwise are or would be converted to immobile, water-insoluble basic forms are either maintained or improved to an extent not otherwise possible. Moreover, this objective is accomplished without applying the gross amounts of acid, urea or other acidifying substance necessary to reduce soil pH generally. This need is avoided by applying the plant nutrients in the described particles so that they are retained in the immediate vicinity of the nitrifier which reduces soil pH in the vicinity of the plant nutrients, thereby maintaining their availability to the crops.

All of these advantages can be obtained by using readily available commercial products such as urea or ammonium nitrate prills. These compositions and methods produce the greatest degree of pH reduction over a longer period of time than can be accomplished with any alternative material. They afford a procedure by which plant nutrients can be added in inexpensive, commercially available, basic (insoluble or only slightly soluble) forms, while maximizing their conversion to mobile, available forms. They also allow the formation of single particles of materials which are otherwise incompatible, e.g., sulfur and urea. In fact, combinations of urea, calcium sulfate and elemental sulfur are particularly preferred, especially in the presence of the basic forms of other plant nutrients. The oxidation of the elemental sulfur to sulfuric acid further contributes to the reduction of soil pH in the vicinity of the fertilizer particle.

Another advantage also results from the increase in particle size accompanying this procedure. The problems associated with handling the smaller commercial prills and additive powders are reduced commensurately. The size of commercially available prills is limited by the characteristics of commercial processes with the exception of the so-called "onionskin process". In that procedure, layers of urea are successively built up to produce particles of ever-increasing size. However, from an agronomic standpoint, this process suffers from a significant disadvantage — the unavoidable buildup of biuret.

The additives which can be incorporated in these compositions, i.e., materials other than urea, ammonium nitrate and calcium sulfate, do not, in and of themselves, constitute an essential aspect of this invention beyond the extent that they are included as third components and can be retained due to the characteristics of the nitrifier-calcium sulfate combination. These materials are generally well known in the art and include any compounds, or for that matter elements themselves, which are desirably added to the soil and which do not excessively reduce particle strength.

Thus, additive selection is, for the most part, a matter of choice. The additive's effect on structural stability of the product particles can be easily evaluated by preparing a sample composition and determining whether or not the particles possess sufficient strength to satisfy the user. In the great majority of cases, and in the case of all the components mentioned specifically herein, the additives can be combined at practical concentrations without unduly reducing particle strength. In fact, some additives such as elemental sulfur, actually improve the structural stability of the combination. This, in itself, seems a paradox in view of the fact that elemental sulfur does not bond at all with urea prills in the absence of calcium sulfate.

Additives which are specifically contemplated within the scope of this invention include the major plant nutrients, the so-called micronutrients, and other soil modifiers such as elemental sulfur. The major nutrients include phosphorus and potassium. Other additives include boron, calcium, iron, magnesium, manganese, copper, zinc and molybdenum. Phosphorus is usually added in the form of phosphates, preferably as the mono- and dihydrogen phosphates of basic cations such as ammonium, calcium, zinc, copper, potassium, iron, manganese, magnesium and boron. The polyphosphates of these cations can also be employed, e.g., ammonium polyphosphates.

Minor amounts of phosphoric acid can also be used. However, due to the susceptibility of the nitrogen source to attack by strong acids and/or oxidizing agents, the amount of phosphoric acid, sulfuric acid or strong oxidizing agents such as nitric acid should be minimized in order to prevent reaction between those agents and the nitrifier.

Boron can be added in numerous forms. Illustrative of these are the several forms of boric acid, e.g., meta, ortho and tetra acids, boron oxide and the borates of basic cations such as ammonium (penta and tetra), calcium, sodium, potassium, magnesium, zinc and copper.

In addition to their use as either phosphates or borates or both, the metal nutrients can be added as the corresponding oxides, sulfates, sulfites, hydroxides, carbonates, nitrates and carboxylates of $C_1$ to $C_8$ mono- and dicarboxylic acids. The carboxylic acid moiety is preferably a hydrocarbyl carboxylic acid group. However, acids containing non-toxic substituents such as ammonium and nitrosyl groups can also be used. The toxicity of such substituents is generally well known and can be readily determined by simple greenhouse or field tests comparing compositions containing such substituents to materials of known toxicity to the selected crop.

These methods and compositions are particularly useful with basic forms of the additives. By this is meant compounds which are more soluble in more acidic environments than in basic environments. Thus, these methods increase the solubility of such basic compounds due to the decreased pH of the environment immediately adjacent the fertilizer particle. Illustrative basic compounds which are more soluble at lower pH levels are the oxides, hydroxides and carbonates of the metal cations referred to above, including potassium, manganese, magnesium, copper, zinc, iron, molybdenum and boron.

Some additives can be used in higher concentrations than others. Thus, if high concentrations are desired the manufacturer should evaluate the affect of the additives on particle strength at several concentrations. Numerous procedures are available for evaluating structural stability, e.g., crushing strength or fragmentation of such particles. Comparative tests can be made simply by producing particles of several different compositions and determining whether or not the resultant particle has the desired strength.

As a general rule particles should contain at least about 40, preferably about 40 to about 90 weight percent nitrifier based on a total weight of the final product. For convenience, the nitrifier concentration is defined by reference to urea or ammonium nitrate, per se, it being appreciated that some or all of the nitrifier is converted to a chemical combination with calcium sulfate.

The nitrifier particles should be particle-form materials, preferably commercially available prills, generally having diameters ranging between about 5 and about 30, preferably between 6 and 16 standard mesh sizes. Although it is not essential to the concept of this invention, the nitrifier particles can also contain minor amounts of impurities or other constituents which may or may not contribute to the strength or agronomic activity of the final product. Such materials are not generally employed, however, due to the added manufacturing expense and the relative economic advantage afforded by the lower cost of substantially pure urea or ammonium nitrate prills.

The starting materials and process conditions should be sufficiently anhydrous to avoid dissolving or melting the nitrifier particles or producing a cohesive particle which might promote agglomeration. This is not to say that the system must be completely anhydrous. On the contrary I have discovered that better results are obtained if minor amounts of free water are originally present.

Several factors influence optimum free water content. The water level should be sufficient to convert all of the calcium sulfate to the dihydrate which is believed to be the reactive species. The conversion of calcium sulfate, or the hemihydrate, to the dihydrate, even in the presence of adequate free water, at ambient conditions is relatively slow. However, it proceeds to completion quite rapidly in a matter of several minutes at elevated temperatures, e.g., 100° F. or higher. Thus, the hydration level of the calcium sulfate must be taken into consideration in determining the amount of free water added to or retained in the system. However, water level should not be so great as to either dissolve any substantial amount of the nitrifier or to reduce its melting point to a level at which it becomes molten at reaction temperatures.

Excessive free water lowers the nitrifier melting point and/or enhances its solubility at elevated temperatures such that a molten or dissolved mass is created at the reaction temperatures employed. Thus, as a general rule the initial free water level should not exceed about 15 weight percent of the total weight of nitrifier and calcium sulfate.

The optimum water level is best determined empirically since it is influenced by the initial hydration level of the calcium sulfate reactant as well as the nature of impurities in either the calcium sulfate, urea or ammonium nitrate which themselves may be convertible to hydrated forms thereby competing with the calcium sulfate for available water. This determination can be made very easily by performing a series of tests using the available calcium sulfate, nitrifier particles, powdered nitrifier, and other desired components, and adding different levels of water to the reaction mixture either prior to or during heating to reaction temperature. An insufficient water level will be indicated by excessive dusting, the lack of complete reaction, and formation of non-uniform particles. Excess water level will be indicated by the formation of agglomerates or a sticky mass of materials resulting from the melting and/or dissolving the nitrogen source.

The calcium sulfate is employed in finely divided form, preferably as a powder, and is preferably at least partially hydrated. The most common hydrates are the hemihydrate, commonly known as plaster of paris, and the dihydrate known as gypsum. Of course, the calcium sulfate can comprise a combination of the hemi- and dihydrate. The calcium sulfate is added in amounts corresponding to about 10 weight percent, preferably at least about 20 weight percent based on the total weight of the final composition. Anhydrous calcium sulfate can also be employed as a starting material, provision being made for hydration in situ. This can be accomplished by adding sufficient amounts of water to the calcium sulfate per se or to the entire reaction mixture or by the injection of steam to provide both heat and water. However, care should be taken to prevent the accumulation of sufficient free water to dissolve or agglomerate the nitrifier particles or binder supplement.

Elemental sulfur is used as a finely divided, preferably powdered form in amounts corresponding to at least about 2, generally at least about 5, and preferably between about 2 and about 20 weight percent based on total weight. Phosphorus and potassium, both major nutrients, are usually employed in concentrations corresponding to about 0.5 and to about 10 weight percent $P_2O_5$ or $K_2O$, respectively. The remaining constituents constitute only a minor amount of the total composition, usually between about 0.1 and about 3 weight percent determined as the metal.

As a general rule the total additive concentration, at its maximum, should be roughly equivalent to the calcium sulfate content. Thus, a product containing, for example, 20 weight percent calcium sulfate should not contain substantially more than 20 weight percent of all other additional additives combined. This general rule is not without exception, however, due to the fact that some of these materials, such as elemental sulfur, actually contribute to particle strength up to a point.

The reaction can be carried out by heating the mixed components to a temperature at which the endothermic reaction proceeds. This temperature can be readily determined by a sharp temperature drop in the solid phase induced by the occurrence of the endothermic reaction and the evolution of water of hydration released from the hydrated calcium sulfate. The reaction usually proceeds at temperatures of about 160° F. with urea and about 220° F. with ammonium nitrate, or higher. However, it is often desirable to heat the solids mixture to a temperature at least 210° F. to drive off free water introduced by the release of water of hydration.

This temperature should not exceed the temperature at which the nitrifier is melted or thermally decomposes. Excess free water can depress the apparent melting point and must be taken into account. Furthermore, the reaction apparently requires a minor induction period and/or the initial reaction rate is relatively slow. As a consequence, excessive heating rates should be avoided so that the melting or thermal decomposition points of the nitrifier are not reached before the reaction proceeds to completion.

This complication can be simply avoided, however, by heating the mixture to or slightly above the temperature at which reaction is known to take place and holding the mixture at that temperature until the reaction is complete. This temperature can be determined by the testing procedure described above, e.g., operating at several different temperatures, either at the same or different initial free water levels, and determining, by observation, the temperature at which reaction takes place and the temperatures that must be avoided to prevent melting and/or thermal decomposition of the nitrifier. When elemental sulfur is added, it is preferred, although not essential, that the temperature be increased to, or above the sulfur melting point, e.g., about 234° to about 248° F., depending on the form of sulfur used.

While this reaction forms very strong aggregates and agglomerates the smaller undersized particles when present, it does not cause excessive agglomeration of the larger nitrifier particles themselves. The tendency toward agglomeration of the larger particles can be controlled by agitating the mixture by mechanical means, fluidization, or the like.

While it is desirable to expel free water from the composition, it of course would be recognized that the product may contain some adsorbed water. The reason for this precaution is, as mentioned above, to avoid dissolving the nitrifier. Thus, water levels below those at which a significant amount of the nitrifier is dissolved are acceptable.

In the continuous recycle operations the desired product will usually be characterized by a predetermined particle size range falling within the limits of 4 to about 20 mesh. Of course the predetermined range can be narrowed within these limits. For instance it may be preferable to isolate a product falling between 8 and 16 mesh sizes. The oversize particles can be eliminated by conventional screening as described hereinafter, crushed and recycled to the reactor alone with fines materials passing 16 mesh. In any given operation the oversize particles will be defined as those having diameters greater than the upper limit of the predetermined range and, for most purposes, will include all particles which do not mass 6 mesh. Undersized particles are those having diameters below the lower limit of the predetermined range and, as a general rule, will include all particles passing the 20 mesh standard sieve.

EXAMPLE 1

The drawing illustrates one embodiment of a continuous recycle operation within the scope of this invention, comprising a helical feed conveyor 2, direct fired rotary kiln reactor 8, product screens 11 and 12, and recycle facilities. The operation of this particular embodiment will be described with reference to an operation employing a rotary kiln reactor being 8 feet in internal diameter and 48 feet in length. The kiln 8 contained 1 foot high lifters running the length of the kiln on 1 foot circumferential spacing. The kiln was operated at an incline to the horizontal of about 4° at a rotation rate of about 4 rpm which provided a holding time of approximately 7 to 8 minutes at a total feed rate of 8 tons per hour.

The feed comprised 64 weight percent urea prills, 30 weight percent calcium sulfate containing 11.2 to 17.6 weight percent free water, and 5 to 6 weight percent powdered elemental sulfur. The urea prills have the particle size distribution illustrated in Table 1.

Table 1

| | Urea Prills | | | | | | | | |
|---|---|---|---|---|---|---|---|---|---|
| Screen No. | +8 | +10 | +12 | +14 | +16 | +18 | +20 | +30 | −30 |
| Weight % | 0.8 | 31.7 | 27.7 | 14.5 | 6.7 | 1.4 | 1.0 | 14.2 | 2.0 |

As illustrated in Table 1 the commercial prills contained a substantial amount of material passing 20 mesh. At first it was believed that the substantial amount of small materials in the urea prill feed would complicate the overall operation and make it very difficult to obtain the desired product particle size distribution. However, we discovered that the smaller material could be converted to larger particles within the desired range by recycling crushed oversize product. The powdered recycle acted as a binder supplement which not only converted the smaller feed particles to product within the desired size range but also facilitated coating of the larger urea prills.

This feed mix was introduced to the system via line 1 wherein it was mixed with recycle returned via line 26 and described hereinafter. This combination was passed via helical feed conveyor 2 and line 3 to receiver 4 of the reactor assembly 5. This assembly was directly fired by gas burner 6 and was provided with auxiliary air inlets 7. Control of air injection to the auxiliary air inlets provided control of the burner gas temperature entering receiver 4 and rotary kiln 8.

The gas temperatures in receiver 4, the point at which the burner flue gas first contacted the feed mix, ranged from 400° to 650° F. The temperatures above 550° F. were excessive and caused melting and uncontrollably rapid feed dehydration. Therefore, the temperature of the inlet gas contacting the feed should be less than about 550° F. At temperatures below 550° F. the kiln remained clean and free of any deposits throughout extended operations of 72 hours or more.

The heating gas and reactants passed longitudinally along the axis of kiln 8 in the direction of arrow 9. The heat load including heat losses through the kiln periphery, heat capacity of the reactants and products, and heat consumption by the endothermic reaction produced exit gas temperature on the order of 200° to 220° F. Product particle temperatures ranged from 180° F. to 220° F. However, incomplete coating was observed at the lower product effluent temperatures as indicated by the presence of up to 10 percent of uncoated urea prills. In this apparatus under the described conditions, it was found that product effluent temperatures should be maintained at a level of at least 210° F. requiring the use of inlet gas temperatures of at least about 400° F. in the feed receiver 4.

The product particles were then passed via line 10 to a first screen 11 from which particles larger than about 6 mesh were passed via line 14 to hammermill 15. The hammermill crushed this byproduct fraction to a powdered recycle fraction of which at least about 50 percent passed 40 mesh. The recycle rate of this fraction ranged between 0.25 and about 2.5 tons per hour. The mill produced a minor amount of dust corresponding to about 0.5 percent of the total feed run which was swept out of the system via line 19. The dust was collected in cyclone 21 and returned to the recycle via line 25. Even smaller fines leaving the cyclone via line 22 were recovered in water scrubber 23. The air sweepstream exited the scrubber via line 24.

Undersized particles passing the 16 mesh screen were recovered via line 13 at a rate corresponding to about 4 to about 20 percent of the total product run. These particles were passed in admixture with the powdered recycle exiting mill 15 and were returned to the reactor via lines 20 and 26.

At the lowest recycle rate observed, only 2 weight percent of the total product run was recovered and recycled as undersized fraction via line 13 while only 2 weight percent was returned via mill 15, producing a total recycle of 4 percent. At this recycle rate, the system produced a substantial proportion of uncoated urea prills, i.e., about 10 weight percent of the urea prill feed. This condition existed at the lowest fresh feed rate of about 5 tons per hour. Increasing the feed rate to 8 tons per hour increased the production of both undersized and oversized material, thereby increasing the recycle rate to 10 percent. This change completely eliminated the presence of unreacted urea prills at the exit of kiln 8. It also promoted aggregation of the undersized fraction into particles within the predetermined product range of 6 to 16 mesh. It was therefore determined that at least 2 and preferably at least 5 weight percent of the total feed to feed receiver 4 should comprise powdered urea or ammonium nitrate or both.

EXAMPLE 2

The results of this example, when compared to those of Example 3, infra, illustrate the superior hardness of particles produced by adding a minor amount of binder supplement material prior to the reaction.

A sample particle population was prepared from urea prills, gypsum and elemental sulfur in a laboratory bench scale rotary granulator. The urea prills were screened to obtain a fraction passing 6 mesh and retained on 16 mesh U.S. standard sieve. This material was then mixed with the calcium sulfate and elemental sulfur and reacted to produce uniformly coated prills containing 34 weight percent nitrogen and 10 weight percent sulfur, the latter being contributed both by the calcium sulfate and elemental sulfur feeds.

The product was screened to obtain a fraction passing 8 mesh and retained on 10 mesh for hardness evaluation. Particle hardness was determined by crushing 25 representative particles from this population on the laboratory apparatus.

The test apparatus comprised a vertically disposed air driven plunger having a flat lower surface for engaging sample particles placed on a flat sample holder immediately beneath the plunger. Air was applied slowly to the cylinder driving the plunger, the rate of air application being controlled by a restriction needle valve in the airline upstream of the pressure cylinder. This procedure allowed a slow, controlled pressure buildup in the cylinder which was continuously read on a pressure gauge between the needle valve and cylinder. The air pressure read on the gauge was converted directly to pounds force applied to the plunger using the cross-sectional area of the plunger driving piston.

Cylinder pressure was allowed to build up continuously until sample failure. Relative crushing strength in pounds per square inch was determined by converting the force applied at failure to pounds per square inch using a mathematical transform. This transform assumed the particles were regular right cylinders the two flat ends of which engaged the plunger lower surface and sample holder respectively. The model further assumed that the total population had diameters corresponding to the size of the mesh opening of the standard screen on which the particles were retained, i.e., 10 mesh. By this analysis the population had a mean crushing strength of 325 psi.

EXAMPLE 3

The analysis of Example 2 was repeated with the exception that the gypsum-urea-sulfur particles were obtained by the continuous operation described in Example 1. Reaction conditions are listed in the following Table:

Table 2

| Feed rates, tons/hr. | |
|---|---|
| Urea prills | 4.2 |
| CaSO$_4$(wet) | 1.45 |
| Sulfur | 0.35 |
| Recycle | 0.6 |
| Temperature, °F. | |
| Inlet gas | 500 |
| Outlet gas | 200 |
| Outlet product | 214 |

Twenty-five sample particles passing 8 mesh and retained on 10 mesh were evaluated as described in Example 2. The mean crushing resistance was 473 psi.

The particles can be applied to the soil by any one of numerous well known procedures and in any effective amount. Methods and levels of application are well known and do not constitute an essential aspect of this invention. Thus, the particles can be used to improve and condition soils in the presence or absence of standing crops by adding an agronomically effective amount of the particulate soil amendment, generally at levels of at least about 10 pounds per acre, preferably about 20 to about 500 pounds per acre. These methods and compositions are particularly suitable for use on basic soils due to the activating effect of the acidic environment created in the immediate vicinity of the particles in the soil. Accordingly, a preferred method involves adding an agronomically effective amount of the particulate soil amendment to soils having pH levels above about 7, particularly above pH 8.

We claim:

1. The method of producing a multicomponent soil amendment containing at least about 40 weight percent of a particulate nitrifier selected from the group consisting of urea, ammonium nitrate and combinations thereof, at least about 10 weight percent calcium sulfate and at least one additional soil additive selected from elemental sulfur, phosphates, borates and compounds having cations selected from the group consisting of potassium, calcium, iron, magnesium, boron, manganese, copper, zinc and molybdenum, and combinations thereof, wherein said amendment comprises said nitrifier particles coated with a layer of the reaction product of calcium sulfate dihydrate and said nitrifier containing said additional soil additive, including the steps of mixing finely divided calcium sulfate dihydrate, nitrifier particles having particle diameters between about 5 and about 30 mesh, an agronomically effective amount of said additional soil additive in particle form, and at least about 2 weight percent based on the total weight of said soil amendment of a powdered binder supplement selected from the group consisting of powdered urea, ammonium nitrate and combinations thereof having particle sizes below about 40 mesh, heating the resulting mixture under substantially anhydrous conditions to an elevated temperature sufficient to promote the endothermic reaction of said calcium sulfate dihydrate and nitrifier and below the melting point of said nitrifier, and produce said multicomponent soil amendment comprising said particulate nitrifier coated with a layer of the reaction product of said calcium sulfate dihydrate, said powdered binder supplement, and said nitrifier particles, said layer containing said additional soil additive.

2. The method of claim 1 wherein at least about 2 weight percent of finely divided elemental sulfur is admixed with said calcium sulfate, nitrifier particles and powdered binder supplement based on the dry weight of said particulate amendment, prior to the reaction of said calcium sulfate and nitrifier particles.

3. The method of claim 1 wherein said mixture of calcium sulfate, nitrifier particles and additive contains an amount of free water corresponding to at least about 2 weight percent based on the weight of said calcium sulfate and below the level at which said nitrifier is dissolved or melted during said reaction, and said mixture of calcium sulfate nitrifier particles and additive is heated to a temperature of at least about 210° F. sufficient to drive off water of hydration released by said reaction.

4. The method of claim 3 wherein said binder supplement is added in amounts corresponding to at least about 5 weight percent based on the dry weight of said calcium sulfate.

5. The method of claim 4 wherein said nitrifier particles are urea prills and said binder supplement is urea powder.

6. The continuous process for producing particulate multicomponent soil amendments containing at least about 40 weight percent of a particulate nitrifier selected from the group consisting of urea, ammonium nitrate and combinations thereof, at least about 10 weight percent calcium sulfate and at least one additional soil additive selected from the group consisting of elemental sulfur, phosphates, borates and compounds having cations selected from the group consisting of potassium, calcium, iron, magnesium, boron, manganese, copper, zinc and molybdenum, and combinations thereof; wherein said amendment comprises said nitrifier particles coated with a layer of the reaction product of said calcium sulfate dihydrate and said nitrifier containing said additional soil additive, including the steps of continuously feeding a mixture of said nitrifier particles, calcium sulfate dihydrate and additive to a heated reaction zone; heating the resulting mixture in said zone to a temperature sufficient to promote the endothermic reaction of said calcium sulfate, dihydrate nitrifier particles and binder supplement, and below the melting point of said nitrifier particles and binder supplement; continuously removing said particulate amendment from said heated reaction zone, crushing at least about 2 weight percent of said amendment particles to powder having particle diameters less than about 40 mesh; and recycling said powder into admixture with said feed to said reaction zone.

7. The method of claim 6 wherein said nitrifier particles are urea prills, said binder supplement is urea powder, and said soil additive comprises at least about 2 weight percent sulfur based on the dry weight of said soil amendment particles.

8. The method of claim 6 including the steps of screening the particulate product recovered from said heated reaction zone to isolate a product fraction having predetermined particle size range within the range of about 4 to about 20 mesh, and an amount corresponding to at least about 2 weight percent the total product weight of at least one of (a) an oversized fraction having particle diameters greater than the upper limit of said predetermined particle size range, and (I) an undersized fraction having particle diameters less than the lower limit of said predetermined range, and crushing an amount corresponding to at least about 2 weight percent of said total product of at least one of said oversized and undersized fractions to powder having particle diameters below about 40 mesh, and recycling said powdered reaction product into admixture with said feed to said heated reaction zone.

9. The method of claim 8 wherein said nitrifier particles are urea prills and said recycled fraction comprises at least about 5 weight percent based on the total product weight from said heated reaction zone.

10. The particulate multicomponent soil amendment comprising said nitrifier particles coated with said layer of the reaction product of calcium sulfate, powdered binder supplement and nitrifier particles containing said additional soil additive, produced by the method of claim 1.

11. The composition of claim 10 prepared by mixing at least 5 weight percent of said powdered binder supplement with said nitrifier, calcium sulfate, and said additive prior to said endothermic reaction.

12. The method of improving and conditioning soil including the steps of applying to said soil an agronomically effective amount of the particulate soil amendment of claim 10.

13. The particulate soil amendment of claim 10 further comprising a moisture-inhibiting amount of a hydrophobic organic moisture inhibitor dispersed at least at the periphery of said layer of said reaction product.

14. The composition of claim 10 wherein said layer comprises at least 2 weight percent elemental sulfur based on the total weight of said soil amendment.

15. The method of improving the agronomical quality of soil including the steps of adding to said soil at least about 10 pounds per acre of the particulate amendment of claim 14.

16. The method of claim 15 wherein said soil is a basic soil having a pH of at least about 8 and said nitrifier particles comprise urea prills.

* * * * *